(12) United States Patent
Xu et al.

(10) Patent No.: US 10,750,140 B2
(45) Date of Patent: Aug. 18, 2020

(54) LASER DISPLAY SYSTEM

(71) Applicant: Technical Institute of Physics and Chemistry of the Chinese Academy of Sciences, Beijing (CN)

(72) Inventors: Zuyan Xu, Beijing (CN); Yong Bi, Beijing (CN); Ke Liu, Beijing (CN); Qinjun Peng, Beijing (CN); Weinan Gao, Beijing (CN); Nan Zong, Beijing (CN)

(73) Assignee: TECHNICAL INSTITUTE OF PHYSICS AND CHEMISTRY OF THE CHINESE ACADEMY OF SCIENCES, Beijing (CN)

( * ) Notice: Subject to any disclaimer, the term of this patent is extended or adjusted under 35 U.S.C. 154(b) by 158 days.

(21) Appl. No.: 15/328,685

(22) PCT Filed: Jul. 21, 2015

(86) PCT No.: PCT/CN2015/084600
§ 371 (c)(1),
(2) Date: Jan. 24, 2017

(87) PCT Pub. No.: WO2016/011928
PCT Pub. Date: Jan. 28, 2016

(65) Prior Publication Data
US 2017/0223318 A1    Aug. 3, 2017

(30) Foreign Application Priority Data

Jul. 24, 2014 (CN) ..................... 2014 1 0357334

(51) Int. Cl.
*G02B 27/20* (2006.01)
*H04N 9/31* (2006.01)
(Continued)

(52) U.S. Cl.
CPC ........... *H04N 9/3182* (2013.01); *G02B 27/09* (2013.01); *G02B 27/10* (2013.01); *G03B 21/006* (2013.01);
(Continued)

(58) Field of Classification Search
CPC .. H04N 9/3182; H04N 9/3164; H04N 9/3144; H04N 9/3155; H04N 9/3197;
(Continued)

(56) References Cited

U.S. PATENT DOCUMENTS 5,724,062 A * 3/1998 Hunter ................. G09G 3/3406
                                                          345/102
2004/0190573 A1 * 9/2004 Kruschwitz .......... H04N 9/3129
                                                          372/39
(Continued)

FOREIGN PATENT DOCUMENTS

CN         1721963          1/2006
CN         1811573          8/2006
(Continued)

OTHER PUBLICATIONS

International Search Report of PCT/CN2015/084600 dated Oct. 10, 2015, 4 pages (English and Chinese).
(Continued)

*Primary Examiner* — William J Carter
*Assistant Examiner* — Omar Rojas Cadima
(74) *Attorney, Agent, or Firm* — Rankin, Hill & Clark LLP (57) ABSTRACT

A laser display system includes a red light semiconductor laser module (1), a green light semiconductor laser module (2), a blue light semiconductor laser module (3), a decoherence device (7, 8, 9), light valves (12, 13, 14), collimating and shaping devices (4, 5, 6), a heat dissipating modules (16-1, 16-2, 16-3), a temperature control module (17) and a
(Continued)

semiconductor laser control module (18). The wavelength range output by the red light semiconductor laser module (1) is from 635 nm to 670 nm; the wavelength range output by the green light semiconductor laser module (2) is from 515 nm to 530 nm; the wavelength range output by the blue light semiconductor laser module (3) is from 440 nm to 460 nm.

10 Claims, 4 Drawing Sheets

(51) Int. Cl.
| | | |
|---|---|---|
| *G02B 27/10* | (2006.01) | |
| *G02B 27/09* | (2006.01) | |
| *G03B 21/20* | (2006.01) | |
| *G09G 3/34* | (2006.01) | |
| *G03B 21/00* | (2006.01) | |
| *G03B 33/12* | (2006.01) | |

(52) U.S. Cl.
CPC .......... *G03B 21/008* (2013.01); *G03B 21/20* (2013.01); *G03B 33/12* (2013.01); *G09G 3/3406* (2013.01); *H04N 9/3105* (2013.01); *H04N 9/317* (2013.01); *H04N 9/3144* (2013.01); *H04N 9/3155* (2013.01); *H04N 9/3161* (2013.01); *H04N 9/3164* (2013.01); *H04N 9/3197* (2013.01); *G09G 2320/041* (2013.01); *G09G 2320/0666* (2013.01)

(58) Field of Classification Search
CPC .... H04N 9/3105; H04N 9/317; H04N 9/3161; G03B 21/006; G03B 21/008; G03B 21/20; G03B 33/12; G09G 3/3406; G09G 2320/0666; G09G 2320/041; G02B 27/10; G02B 27/09
USPC ........................................................ 362/259
See application file for complete search history.

(56) References Cited

U.S. PATENT DOCUMENTS

| | | | |
|---|---|---|---|
| 2009/0122531 A1 | 5/2009 | Sumiyama et al. | |
| 2014/0293431 A1* | 10/2014 | Ishimoto | ................ G03B 21/16 |
| | | | 359/630 |

FOREIGN PATENT DOCUMENTS

| | | |
|---|---|---|
| CN | 101702063 | 5/2010 |
| CN | 102141216 | 8/2011 |
| CN | 103886807 | 6/2014 |
| CN | 104166300 | 11/2014 |
| WO | 2013190778 | 12/2013 |

OTHER PUBLICATIONS

Office Action of CN Application No. 201410357334.4 dated Jan. 23, 2015, 4 pages.
Office Action of CN Application No. 201410357334.4 dated Jun. 5, 2015, 3 pages.
Notification of Grant of CN Application No. 201410357334.4 dated Sep. 16, 2015, 1 page.

* cited by examiner

LASER DISPLAY SYSTEM

TECHNICAL FIELD

The present invention relates to the technical field of laser display, and more particularly to a laser display system.

BACKGROUND

Laser has high luminance, so it is easier for laser display to achieve large-screen display within the geometric resolution limit of human eyes; the laser is a line spectrum (e.g., the spectral width of 5 nm), while the spectral width of the existing display light source is 40 nm. Hence, the number of colors which can be presented by the laser display is about 500 times higher than that presented by the existing display, so the laser display can achieve double-high-definition display. Meanwhile, the laser has higher color saturation. By selecting wavelengths of tricolors close to the apex angle of the chromatic triangle, the area of the formed chromatic triangle can be made as large as possible so that truer and richer colors can be displayed like the real world. True three-dimensional display can be achieved through the laser holographic technique. Therefore, the laser display is the development direction for the future display technologies. Using tricolor semiconductor laser LD modules as a light source for the laser display has the advantages of electric excitation, high efficiency, long service life, all-solid state, miniaturization and low cost, so the tricolor (red, green and blue) LD modules are an optimal light source for the laser display industrialization in the future.

As the tricolor LD is currently at the research stage of industrialization, and the performance and the price cannot meet requirements for the laser display industrialization, reports about the laser display at present are mostly about using the all-solid state laser or the mixed light source to obtain the tricolor light source. For example, in 2006, Chinese Academy of Sciences used the all-solid state laser as the tricolor light source to achieve demonstration of 84-inch and 140-inch laser television series prototypes; in 2009, Mitsubishi of Japan used the solid-state laser and LD mixed light source to develop 65-inch and 75-inch laser televisions; in 2010, Casio of Japan developed the laser projection prototype using the LD, LED and phosphor mixed light source; and in 2011, Mitsubishi further developed the liquid crystal television using the LD module and LED mixed illumination. If the all-solid state laser is used as the tricolor light source, large-scale production cannot be achieved, and there are disadvantages of unadjustable wavelengths, a complicated structure and a low efficiency; and if the LD module and phosphor mixed light source is used, the advantages of the laser display cannot be sufficiently exhibited as the fluorescence has a wide spectrum.

BRIEF DESCRIPTION

(I) Technical Problem to be Solved

The technical problem to be solved by the present invention is how to achieve higher color gamut coverage and color temperature adjustability of a laser display system.

(II) Technical Solution

To solve the above technical problem, the present invention provides a laser display system, which comprises a red light semiconductor laser module, a green light semiconductor laser module, a blue light semiconductor laser module, collimating and shaping devices, decoherence devices, light valves and an imaging lens.

The collimating and shaping devices and the decoherence devices are respectively arranged in sequence on output light paths of the red light semiconductor laser module, the green light semiconductor laser module and the blue light semiconductor laser module. Three laser beams processed by the decoherence devices firstly pass through the light valves on their own light paths and are then performed beam combination; or they are firstly performed beam combination, then enter the same light valve, and pass through the imaging lens to present an image on a screen.

The wavelength range of the laser output by the red light semiconductor laser module is from 635 nm to 670 nm; the wavelength range of the laser output by the green light semiconductor laser module is from 515 nm to 530 nm; and the wavelength range of the laser output by the blue light semiconductor laser module is from 440 nm to 460 nm.

Preferably, the laser display system further comprises a temperature control module and three heat dissipating modules; the red light semiconductor laser module, the green light semiconductor laser module and the blue light semiconductor laser module are respectively fixed on the heat dissipating modules. The temperature control module controls heat dissipating capacity of the three heat dissipating modules respectively, so as to control the wavelengths of the emitted laser. The temperature can be controlled by the temperature control module to adjust the wavelengths of the semiconductor laser modules which are at a specific output power, especially at a higher power.

Preferably, the red light semiconductor laser module at least comprises one red light semiconductor laser unit. Each semiconductor laser unit has a different central wavelength, and the combination of the central wavelengths is covered by the wavelength range of the laser output by the red light semiconductor laser module. The green light semiconductor laser module at least comprises one green light semiconductor laser unit. Each green light semiconductor laser unit has a different central wavelength, and the combination of the central wavelengths is covered by the wavelength range of the laser output by the green light semiconductor laser module. The blue light semiconductor laser module at least comprises one blue light semiconductor laser unit. Each blue light semiconductor laser unit has a different central wavelength, and the combination of the central wavelengths is covered by the wavelength range of the laser output by the blue light semiconductor laser module.

The semiconductor laser unit is composed of a single semiconductor laser emitter or a semiconductor laser array.

Preferably, the laser display system further comprises a semiconductor laser control module, the semiconductor laser control module can control the red light semiconductor laser unit in the red light semiconductor laser module, the green light semiconductor laser unit in the green light semiconductor laser module, and the blue light semiconductor laser unit in the blue light semiconductor laser module respectively, and can select the semiconductor laser units of appropriate central wavelengths in the red light semiconductor laser module, the green light semiconductor laser module and the blue light semiconductor laser module to emit light according to color requirements of a display, thereby enabling the formed chromatic triangle to cover the corresponding color region. The color range which can be covered by the corresponding chromatic triangle formed by the intercombination of the wavelengths of the red light semiconductor laser unit, the green light semiconductor laser unit and the blue light semiconductor laser unit is the one which can be covered by the laser display system of the present invention. Obviously, the color gamut coverage of the laser display system of the present invention is larger than the chromatic triangle formed by the tricolor (red, green and blue) laser with a single wavelength.

Preferably, a device performing beam combination is a beam combiner, which is specifically an X-prism, a TIR prism or a spatial-timing combining device.

Preferably, the light valves are transmission type liquid crystal light valves, reflective type liquid crystal light valves or digital micro-mirrors.

Preferably, the collimating and shaping devices are aspherical lenses, cylindrical lenses or spherical lenses; and the decoherence devices are micro optical devices, vibration reflectors, rotatable wave plates, multimode fibers or optical beam scanners.

According to another aspect of the present invention, a laser display system is provided, which comprises a red light semiconductor laser module, a green light semiconductor laser module, a blue light semiconductor laser module, collimating and shaping devices, decoherence devices, a reflective film, a light guide plate and a liquid crystal panel. The collimating and shaping devices and the decoherence devices are respectively arranged in sequence on output light paths of the red light semiconductor laser module, the green light semiconductor laser module and the blue light semiconductor laser module. Three laser beams processed by the decoherence devices pass through the reflective film, the light guide plate and the liquid crystal panel in sequence to obtain a clear image. The red light semiconductor laser module comprises at least two red light semiconductor laser units, the green light semiconductor laser module comprises at least two green light semiconductor laser units, and the blue light semiconductor laser module comprises at least two blue light semiconductor laser units. Central wavelengths of the red light semiconductor laser units are selected from 635 nm to 670 nm; central wavelengths of the green light semiconductor laser units are selected from 515 nm to 530 nm; and central wavelengths of the blue light semiconductor laser units are selected from 440 nm to 460 nm, the central wavelengths of the semiconductor laser units are different; the system further comprises a semiconductor laser control module. The semiconductor laser control module can respectively control the red light semiconductor laser units in the red light semiconductor laser module, the green light semiconductor laser units in the green light semiconductor laser module, and the blue light semiconductor laser units in the blue light semiconductor laser module and select the semiconductor laser units of appropriate central wavelengths to emit light according to color requirements of a display, thereby enabling the formed chromatic triangle to cover the corresponding color region.

According to a further aspect of the present invention, a laser light source is provided, which comprises a red light semiconductor laser module, a green light semiconductor laser module, and a blue light semiconductor laser module. The red light semiconductor laser module comprises at least one red light semiconductor laser unit, the green light semiconductor laser module comprises at least one green light semiconductor laser unit, and the blue light semiconductor laser module comprises at least one blue light semiconductor laser unit, at least one of the red light semiconductor laser module, the green light semiconductor laser module and the blue light semiconductor laser module comprises at least two semiconductor laser units, the central wavelengths of the semiconductor laser units are different; the system further comprises a semiconductor laser control module which respectively controls the red light semiconductor laser unit in the red light semiconductor laser module, the green light semiconductor laser unit in the green light semiconductor laser module, and the blue light semiconductor laser unit in the blue light semiconductor laser module, and selects the semiconductor laser units of appropriate central wavelengths to emit light according to color requirements of a display, thereby enabling the formed chromatic triangle to cover the corresponding color region.

(III) Advantageous Effects

The present invention provides a laser display system. The present invention can achieve a larger color gamut coverage and richer and vivider display colors by using the tricolor LD modules with adjustable wavelengths as a laser light source. Color temperature adjustment of the display can further be achieved by adjusting the wavelengths and the powers of the tricolor (red, green and blue) semiconductor lasers, which can be used in the fields such as seamless joining of the large-screen laser display. The system not only has the advantages that are typical of the laser display, but also has the advantages of electric excitation, high efficiency, long service life, all-solid state, miniaturization, low cost, color temperature adjustability and higher color gamut coverage.

BRIEF DESCRIPTION OF THE DRAWINGS

To illustrate the embodiments of the present invention or the technical solutions of the prior art more clearly, the drawings required to be used in the embodiments or the prior art descriptions will be briefly described below, and it will be apparent that the drawings described below are merely some embodiments of the present invention, other drawings may also be obtained from these drawings by those skilled in the art without any creative work.

DETAILED DESCRIPTION

The present invention will be described in further detail with reference to the accompanying drawings and embodiments. The following embodiments serve to illustrate the present invention, but should not be construed to limit the scope of the present invention.

Embodiment I

Figure 1:
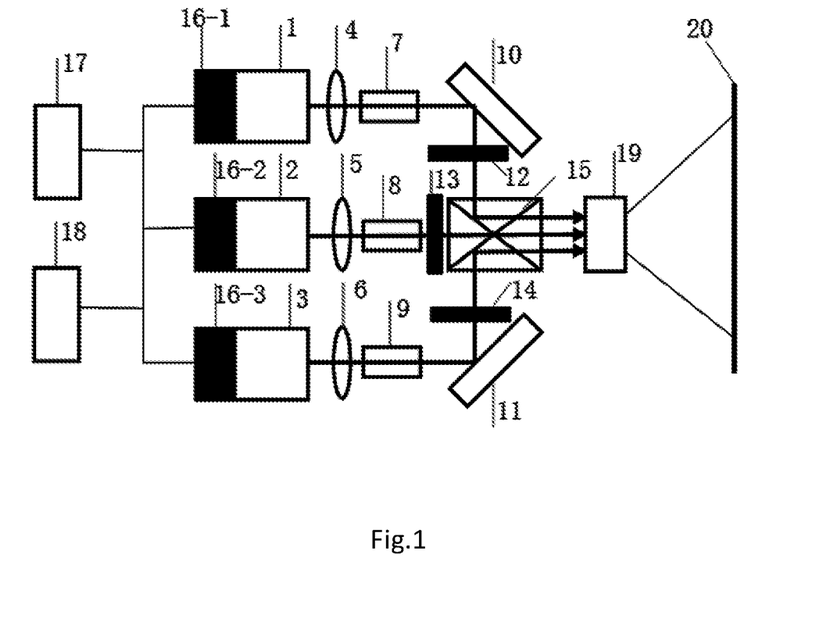
FIG. 1 is a schematic structural view of a laser display system according to a preferred embodiment I of the present invention.

FIG. 1 is a schematic structural view of a laser display system according to a preferred embodiment of the present invention; the laser display system comprises a red light semiconductor laser module 1, a green light semiconductor laser module 2, a blue light semiconductor laser module 3, decoherence devices, light valves and collimating and shaping devices. The red light semiconductor laser module 1 is fixed on a heat dissipating module 16-1 and comprises 5 red light semiconductor laser units with central wavelengths of 635 nm, 640 nm, 650 nm, 660 nm and 670 nm respectively; a red light collimating and shaping lens 4, a red light decoherence device 7, a red light valve 12 and a beam combiner 15 are arranged in sequence on the output light path of the red light semiconductor laser module 1; the green light semiconductor laser module 2 is fixed on a heat dissipating module 16-2 and comprises 3 green light semiconductor laser units with central wavelengths of 515 nm, 520 nm and 530 nm respectively; a green light collimating and shaping lens 5, a green light decoherence device 8, a green light valve 13 and a beam combiner 15 are arranged in sequence on the output light path of the green light semiconductor laser module 2; the blue light semiconductor laser module 3 is fixed on a heat dissipating module 16-3 and comprises 3 blue light semiconductor laser units with central wavelengths of 440 nm, 450 nm and 460 nm respectively; a blue light collimating and shaping lens 6, a blue light decoherence device 9, a blue light valve 14 and a beam combiner 15 are arranged in sequence on the output light path of the blue light semiconductor laser module 3. The output light path of the beam combiner is provided in sequence with an imaging lens 19 and a screen 20. A red light reflection mirror 10 is provided between the red light decoherence device 7 and the red light valve 12; a blue light reflection mirror 11 is provided between the blue light decoherence device 9 and the blue light valve 14. The semiconductor laser unit is composed of a single semiconductor laser emitter or a semiconductor laser array. The collimating and shaping device is an aspherical lens, a cylindrical lens or a spherical lens.

Figure 2:
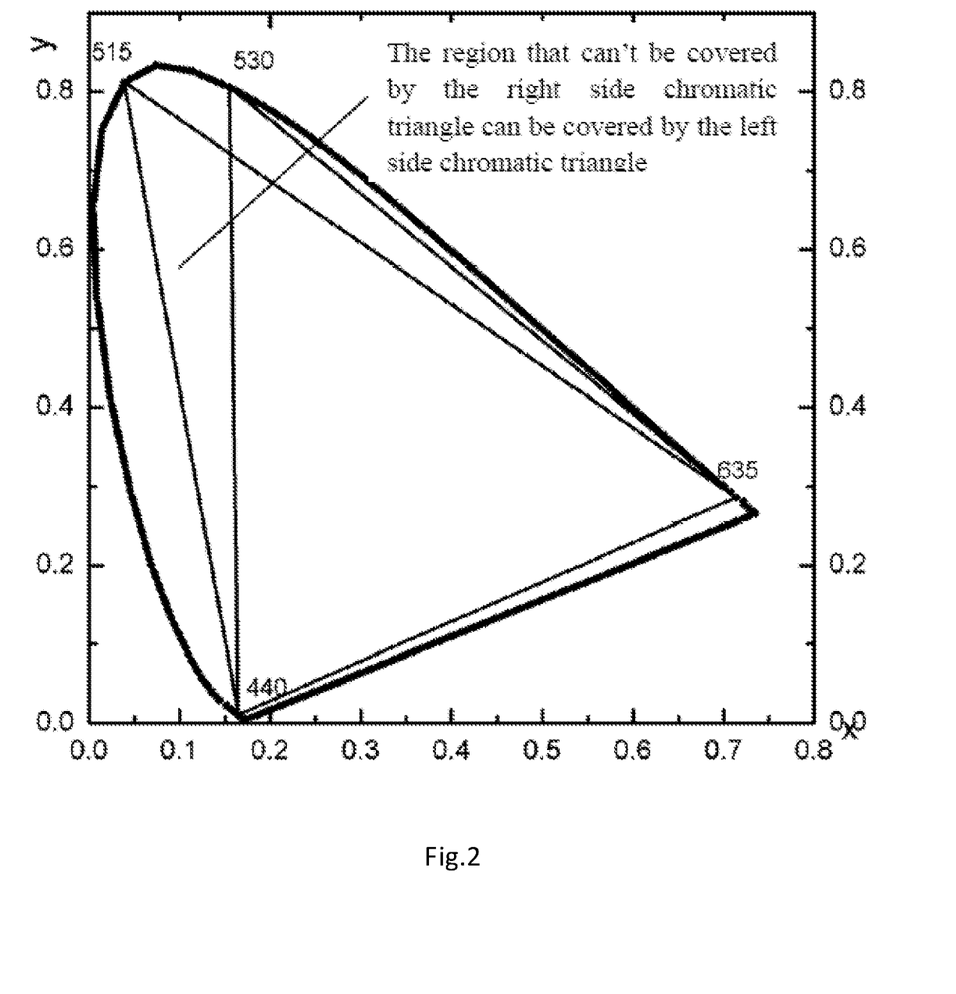
FIG. 2 is a schematic view of the color gamut coverage of the laser display system according to a preferred embodiment I of the present invention.

The laser display system further comprises a temperature control module 17 and a semiconductor laser control module 18, wherein the temperature control module 17 may control the heat dissipating capacity of the heat dissipating modules 16-1, 16-2 and 16-3 respectively, thus control the temperature and wavelengths of the red light semiconductor laser module 1, the green light semiconductor laser module 2 and the blue light semiconductor laser module 3 which are at a specific power, especially at a high power; the semiconductor laser control module 18 may automatically select semiconductor laser units of appropriate center wavelengths to emit light according to color requirements of a display, thereby achieving a higher color gamut coverage than the prior art could. For example, with a semiconductor laser control module, a red semiconductor laser unit with a central wavelength of 635 nm in the red semiconductor laser module 1 is selected to emit light, a green semiconductor laser unit with a central wavelength of 530 nm in the green semiconductor laser module 2 is selected to emit light, and a blue light semiconductor laser unit with a central wavelength of 440 nm in the blue semiconductor laser module 3 is selected to emit light, and the chromatic triangle thereof is as shown in FIG. 2. According to color requirements of a display, in order to display colors in the uncovered portion in the left chromatic triangle mentioned above in FIG. 2, a green light semiconductor laser unit with a center wavelength of 515 nm in the green light semiconductor laser module 2 may be controlled to emit light through the semiconductor laser control module, so that the uncovered portion of color region in the first chromatic triangle is covered by a newly composed chromatic triangle, thereby expanding the color gamut coverage of the display. Likewise, the color regions that can be covered by a chromatic triangle formed by any combination of semiconductor laser units with different central wavelengths in the red, green and blue semiconductor laser modules in the present embodiment are all the color ranges that can be covered by the laser display system of the present invention, thereby significantly improving the color gamut coverage.

The decoherence devices 7, 8 and 9 used in this embodiment can be constructed by using a shock reflection mirror, a rotating wave plate, or the like; the light valves 12, 13 and 14 used are transmission type liquid crystal light valves; the beam combiner 15 used is an X prism. The laser beams output by the red semiconductor laser module 1, the green light semiconductor laser module 2 and the blue light semiconductor laser module 3, respectively, are incident to the corresponding light valve after passing through the collimating and shaping lens and the decoherence device. Digitally modulated signal is added onto the light valve upon conversion by the signal source. The red, green and blue images of different gradation levels are generated by turning on and off the light valve unit. The modulated tricolor laser with different gradation levels is combined into one beam by the beam combiner 15, then is incident to the imaging lens 19, so that the three-color image is combined into a color image, and the color image is projected onto the screen 20 with a distance to achieve a large color gamut laser display.

Embodiment II

Figure 3:
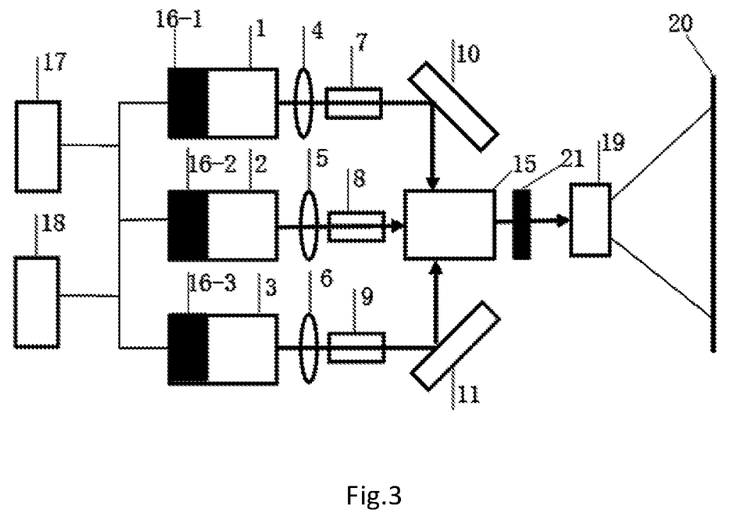
FIG. 3 is a schematic structural view of a laser display system according to another preferred embodiment II of the present invention.
Figure 4:
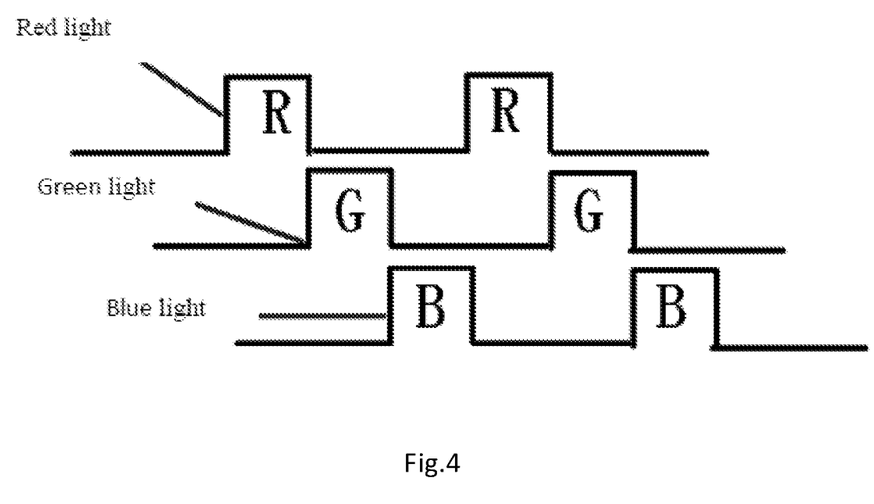
FIG. 4 is a timing diagram of the laser display system according to another preferred embodiment II of the present invention.

FIG. 3 is a schematic structural view of a laser display system according to another preferred embodiment II of the present invention; FIG. 4 is a schematic timing view of a laser display system according to another preferred embodiment II of the present invention. The laser display system of the present embodiment comprises a red light semiconductor laser module 1, a green light semiconductor laser module 2, a blue light semiconductor laser module 3, decoherence devices, light valves and collimating and shaping devices. The red light semiconductor laser module 1 is fixed on a heat dissipating module 16-1 and comprises 3 red light semiconductor laser units with central wavelengths of 635 nm, 650 nm and 670 nm respectively; a red light collimating and shaping lens 4, a red light decoherence device 7, a beam combiner 15 and a single-panel light valve 21 are arranged in sequence on the output light path of the red light semiconductor laser module 1; the green light semiconductor laser module 2 is fixed on a heat dissipating module 16-2 and comprises two green light semiconductor laser units with central wavelengths of 515 nm and 530 nm respectively; a green light collimating and shaping lens 5, a green light decoherence device 8, a beam combiner 15 and a single-panel light valve 21 are arranged in sequence on the output light path of the green light semiconductor laser module 2; the blue light semiconductor laser module 3 is fixed on a heat dissipating module 16-3 and comprises 3 blue light semiconductor laser units with central wavelengths of 440 nm, 450 nm and 460 nm respectively; a blue light collimating and shaping lens 6, a blue light decoherence device 9, a beam combiner 15 and a single-panel light valve 21 are arranged in sequence on the output light path of the blue light semiconductor laser module 3. The output light path of the beam combiner is provided in sequence with an imaging lens 19 and a screen 20. A red light reflection mirror 10 is provided between the red light decoherence device 7 and the beam combiner; a blue light reflection mirror 11 is provided between the blue light decoherence device 9 and the beam combiner 15. The semiconductor laser unit is composed of a single semiconductor laser emitter or a semiconductor laser array. The collimating and shaping device is an aspherical lens, a cylindrical lens or a spherical lens.

The laser display system further comprises a temperature control module 17 and a semiconductor laser control module 18, wherein the temperature control module 17 may control heat dissipating capacity of heat dissipating modules 16-1, 16-2 and 16-3 respectively, thus control the temperature and wavelengths of the red light semiconductor laser module 1, the green light semiconductor laser module 2 and the blue light semiconductor laser module 3 which are at a specific power, especially at a high power; the semiconductor laser control module 18 may automatically select semiconductor laser units of appropriate center wavelengths to emit light according to color requirements of a display, thereby achieving a higher color gamut coverage than the prior art could. For example, with a semiconductor laser control module, a red semiconductor laser unit with a central wavelength of 635 nm in the red semiconductor laser module 1 is selected to emit light, a green semiconductor laser unit with a central wavelength of 530 nm in the green semiconductor laser module 2 is selected to emit light, and a blue light semiconductor laser unit with a central wavelength of 440 nm in the blue semiconductor laser module 3 is selected to emit light, and the chromatic triangle thereof is as shown by a triangle on the right side in FIG. 2. According to color requirements of a display, in order to display an uncovered color portion in the region of lower left corner of the chromatic triangle mentioned above, a blue light semiconductor laser unit with a center wavelength of 460 nm in the blue light semiconductor laser module 3 may be controlled to emit light through a semiconductor laser control module, so that the uncovered portion of color region in the first chromatic triangle is covered by a newly composed chromatic triangle, thereby expanding the color gamut coverage of the display. Likewise, the color regions that can be covered by a chromatic triangle formed by any combination of semiconductor laser units with different central wavelengths in the red, green and blue semiconductor laser modules in the present embodiment are all the colors that can be covered by the laser display system of the present invention, thereby significantly improving the laser display color gamut coverage.

The red light semiconductor laser module 1, the green light semiconductor laser module 2 and the blue light semiconductor laser module 3 of the present embodiment emit light beams in a time-sequential manner. The light beams are combined by the beam combiner 15, and then is time-division modulated by the single-panel light valve 21 to achieve tricolor synthesis. The single-panel light valve used is a digital micromirror device (DMD); after passing through the light collimating and shaping device and the decoherence device, the laser beams output by the red semiconductor laser module 1, the green light semiconductor laser module 2 and the blue light semiconductor laser module 3 are combined into one beam by a beam spatial-timing combination device, then is incident to the single-panel light valve. Digitally modulated signal is added onto the single-panel light valve which time-divisionally modulates the tricolor laser of red, green and blue upon conversion by the signal source. The red, green and blue images of different gradation levels are generated by turning on and off the single-panel light valve 21, then are incident onto the imaging lens system 19, and the tricolor image is projected onto the screen 20 with a distance, then a large color gamut display can be achieved. Due to the persistence of vision effect of human eyes and the fact that luminescence interval of the tricolor LD modules is far smaller than the distinguishable time interval of human eyes, the three-color images observed by human eyes are combined into a color image to achieve a large color gamut laser display.

Embodiment III

Figure 5:
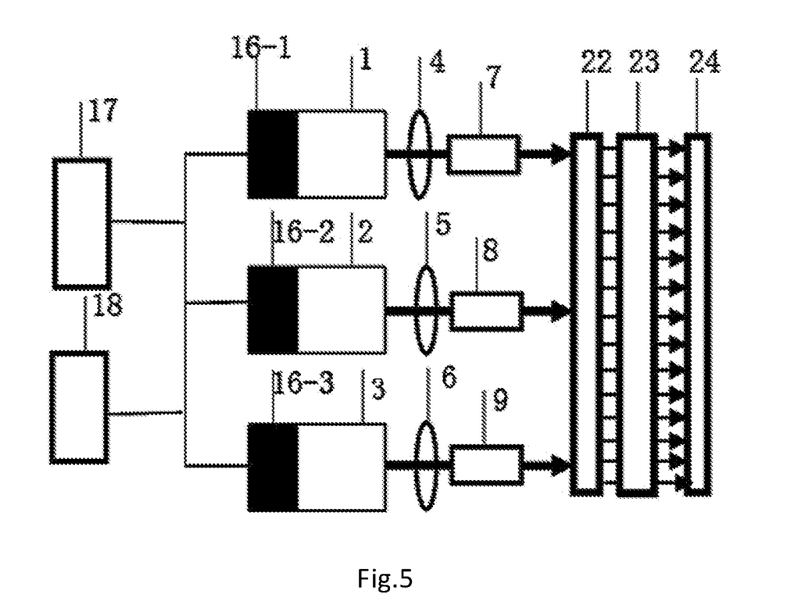
FIG. 5 is a schematic structural view of a laser display system according to a further preferred embodiment III of the present invention.

FIG. 5 is a schematic structural view of a laser display system according to a further preferred embodiment III of the present invention; in this embodiment, a laser display system according to the present invention is applied to a liquid crystal back-light display. The system of the present embodiment comprises a red light semiconductor laser module 1, a green light semiconductor laser module 2, a blue light semiconductor laser module 3, decoherence devices, collimating and shaping devices, a liquid crystal panel 24, a light guide plate 23 and a reflective film 22, wherein the red light semiconductor laser module 1 is fixed on a heat dissipating module 16-1 and comprises two red light semiconductor laser units with central wavelengths of 635 nm and 670 nm respectively; a red light collimating and shaping lens 4, a red light decoherence device 7, a reflective film 22, a light guide plate 23 and a liquid crystal panel 24 are arranged in sequence on the output light path of the red light semiconductor laser module 1; the green light semiconductor laser module 2 is fixed on a heat dissipating module 16-2 and comprises two green light semiconductor laser units with central wavelengths of 515 nm and 530 nm respectively; a green light collimating and shaping lens 5, a green light decoherence device 8, a reflective film 22, a light guide plate 23 and a liquid crystal panel 24 are arranged in sequence on the output light path of the green light semiconductor laser module 2; the blue light semiconductor laser module 3 is fixed on a heat dissipating module 16-3 and comprises 2 blue light semiconductor laser units with central wavelengths of 440 nm and 460 nm respectively; a blue light collimating and shaping lens 6, a blue light decoherence device 9, a reflective film 22, a light guide plate 23 and a liquid crystal panel 24 are arranged in sequence on the output light path of the blue light semiconductor laser module 3.

The semiconductor laser unit is composed of a single semiconductor laser emitter or a semiconductor laser array. The collimating and shaping device is an aspherical lens, a cylindrical lens or a spherical lens.

The laser display system further comprises a temperature control module 17 and a semiconductor laser control module 18, wherein the temperature control module 17 may control heat dissipating capacity of heat dissipating modules 16-1, 16-2 and 16-3 respectively, so as to control temperature and wavelengths of a red light semiconductor laser module 1, a green light semiconductor laser module 2 and a blue light semiconductor laser module 3 which are at specific output power, especially at a high power; and the semiconductor laser control module 18 may select semiconductor laser units of appropriate center wavelengths to emit light according to color requirements of a display, thereby achieving a higher color gamut coverage than the prior art could. For example, with a semiconductor laser control module, a red semiconductor laser unit with a central wavelength of 635 nm in the red semiconductor laser module 1 is selected to emit light, a green semiconductor laser unit with a central wavelength of 530 nm in the green semiconductor laser module 2 is selected to emit light, and a blue light semiconductor laser unit with a central wavelength of 440 nm in the blue semiconductor laser module 3 is selected to emit light, and the chromatic triangle thereof is as shown by a triangle on the right side in FIG. 2. According to color requirements of a display, in order to display an uncovered color portion in an area on the lower side of the chromatic triangle, a red light semiconductor laser unit with a central wavelength of 670 nm of the red light semiconductor laser module 1 may be controlled to emit light through the semiconductor laser control module, so that an uncovered portion of the color region on the lower side of the first chromatic triangle is covered, thereby expanding a color gamut coverage of the display. Likewise, the color regions that can be covered by a chromatic triangle formed by any combination of semiconductor laser units with different central wavelengths in the red, green and blue semiconductor laser modules in the present embodiment are all the color ranges that can be covered by the laser display system of the present invention, thereby significantly improving the color gamut coverage.

The liquid crystal panel 24 has the same function as the light valve mentioned above does.

Laser beams emitted from the red light semiconductor laser module 1, the green light semiconductor laser module 2 and the blue light semiconductor laser module 3 pass through their corresponding laser collimating and shaping device and corresponding decoherence device respectively to be mixed and then arrive at the liquid crystal panel successively through a reflective film and a light guide plate. The digitally modulated signal is added onto the liquid crystal panel upon conversion by a signal source, and a three-color image of red, green and blue with different gray levels is generated by rotational motion of a liquid crystal cell. The three-color image is combined into a color image through observation of human eyes to achieve a large color gamut laser display.

The laser display system of the present invention uses a tricolor LD module with a tunable wavelength as a laser light source, to achieve a chromatic triangle area as large as possible and provide more abundant and bright displayable color, and has not only common advantages of laser display but also advantages such as electrical excitation, high efficiency, long service life, all-solid state, miniaturization, low cost, tunable color temperature, and higher color gamut, thereby achieving a larger color gamut coverage of the laser display and being applied to fields such as large screen display seamless splice.

Obviously, the above described invention is applied to a transmission type display system, however, those skilled in the art may obtain, according to the concept of this invention, different solutions for a reflective type display system without any creative work. Therefore, a solution for a reflective type display system is also primary content of the present invention.

It is intended that the above embodiments are merely used as illustration of the invention but not to limit the invention in any way. Although the present invention has been described with reference to the embodiments, it should be understood by those skilled in the art that, various combinations, modifications or equivalent arrangements may be made to the solution of the present invention without departing from the scope and spirit of the invention as disclosed in the accompanying claims.

The invention claimed is:

1. A laser display system comprising a red light semiconductor laser module, a green light semiconductor laser module, a blue light semiconductor laser module, and a collimating and shaping device, a decoherence device, a light valve and an imaging lens that are arranged in sequence on output light paths of the red light semiconductor laser module, the green light semiconductor laser module and the blue light semiconductor laser module, respectively, wherein the red light semiconductor laser module comprises at least one red light semiconductor laser unit, the green light semiconductor laser module comprises at least one green light semiconductor laser unit, the blue light semiconductor laser module comprises at least one blue light semiconductor laser unit, and at least one of the red light semiconductor laser module, the green light semiconductor laser module and the blue light semiconductor laser module comprises at least two corresponding semiconductor laser units having central wavelengths different from each other; central wavelengths of the red light semiconductor laser units are selected from 635 nm to 670 nm; central wavelengths of the green light semiconductor laser units are selected from 515 nm to 530 nm, central wavelengths of the blue light semiconductor laser units are selected from 440 nm to 460 nm, and the central wavelengths of the red, green and blue semiconductor laser units are different; and the system further comprises a semiconductor laser control module, wherein the semiconductor laser control module respectively controls the red light semiconductor laser unit in the red light semiconductor laser module, the green light semiconductor laser unit in the green light semiconductor laser module and the blue light semiconductor laser unit in the blue light semiconductor laser module, selects each one of the red, green and blue semiconductor laser units and another one of the red, green or blue semiconductor laser unit based on appropriate central wavelengths to emit light according to color requirements of a display so as to form a first chromatic triangle defined by three central wavelengths of the selected each one of the red, green and blue semiconductor laser units and a second chromatic triangle defined by two of the three central wavelengths of two of the selected each one of the red, green and blue semiconductor laser units and one of the central wavelength of the selected another one of the red, green or blue semiconductor laser unit, wherein the one central wavelength of the selected another one of the red, green or blue semiconductor laser unit falls into a region not covered by the first chromatic triangle.

2. The laser display system according to claim 1, further comprising a temperature control module and multiple heat dissipating modules; the red light semiconductor laser module, the green light semiconductor laser module and the blue light semiconductor laser module are respectively fixed on different heat dissipating modules; the temperature control module respectively controls heat dissipating capacity of the multiple heat dissipating modules, so as to control a wavelength of the emitted laser.

3. The laser display system according to claim 1, wherein
the red light semiconductor laser module comprises at least two red light semiconductor laser units;
the green light semiconductor laser module comprises at least two green light semiconductor laser units;
the blue light semiconductor laser module comprises at least two blue light semiconductor laser units.

4. The laser display system according to claim 1, wherein the semiconductor laser units are composed of a single semiconductor laser emitter or a semiconductor laser array.

5. The laser display system according to claim 1, wherein a device performing beam combination is a beam combiner.

6. The laser display system according to claim 1, wherein a device performing beam combination is an X prism, a TIR prism or a spatial-timing combination device.

7. The laser display system according to claim 1, wherein the light valve is a transmission type liquid crystal light valve, a reflective type liquid crystal light valve or a digital micro-mirror.

8. The laser display system according to claim 1, wherein the collimating and shaping device is an aspherical lens, a cylindrical lens or a spherical lens; the decoherence devices are micro optical devices, vibration reflectors, rotatable wave plates, multimode fibers or optical beam scanners.

9. A laser display system comprising a red light semiconductor laser module, a green light semiconductor laser module, a blue light semiconductor laser module, collimating and shaping devices, decoherence devices, a reflective film, a light guide plate and a liquid crystal panel, wherein
- a corresponding collimating and shaping device and a corresponding decoherence device are respectively arranged in sequence on output light paths of the red light semiconductor laser module, the green light semiconductor laser module and the blue light semiconductor laser module; three laser beams processed by the decoherence devices pass through the reflective film, the light guide plate and the liquid crystal panel in sequence to obtain a clear image;
- the red light semiconductor laser module comprises at least two red light semiconductor laser units having central wavelengths different from each other, the green light semiconductor laser module comprises at least two green light semiconductor laser units having central wavelengths different from each other, and the blue light semiconductor laser module comprises at least two blue light semiconductor laser units having central wavelengths different from each other; the central wavelengths of the red light semiconductor laser units are selected from 635 nm to 670 nm; the central wavelengths of the green light semiconductor laser units are selected from 515 nm to 530 nm; the central wavelengths of the blue light semiconductor laser units are selected from 440 nm to 460 nm, and the central wavelengths of the red, green and blue semiconductor laser units are different; and
- the system further comprises a semiconductor laser control module, wherein the semiconductor laser control module respectively controls the red light semiconductor laser unit in the red light semiconductor laser module, the green light semiconductor laser unit in the green light semiconductor laser module and the blue light semiconductor laser unit in the blue light semiconductor laser module, selects each one of the red, green and blue semiconductor laser units and another one of the red, green or blue semiconductor laser unit based on appropriate central wavelengths to emit light according to color requirements of a display so as to form a first chromatic triangle defined by three central wavelengths of the selected each one of the red, green and blue semiconductor laser units and a second chromatic triangle defined by two of the three central wavelengths of two of the selected each one of the red, green and blue semiconductor laser units and one of the central wavelength of the selected another one of the red, green or blue semiconductor laser unit, wherein the one central wavelength of the selected another one of the red, green or blue semiconductor laser unit falls into a region not covered by the first chromatic triangle.

10. A system comprising:
- a laser light source comprising a red light semiconductor laser module, a green light semiconductor laser module and a blue light semiconductor laser module, wherein
- the red light semiconductor laser module comprises at least one red light semiconductor laser unit, the green light semiconductor laser module comprises at least one green light semiconductor laser unit, the blue light semiconductor laser module comprises at least one blue light semiconductor laser unit, at least one of the red light semiconductor laser module, the green light semiconductor laser module and the blue light semiconductor laser module comprises at least two semiconductor laser units having central wavelengths different from each other, and the central wavelengths of the red, green and blue semiconductor laser units are different; and
- the system further comprises a semiconductor laser control module, wherein the semiconductor laser control module respectively controls the red light semiconductor laser unit in the red light semiconductor laser module, the green light semiconductor laser unit in the green light semiconductor laser module and the blue light semiconductor laser unit in the blue light semiconductor laser module, selects each one of the red, green and blue semiconductor laser units and another one of the red, green or blue semiconductor laser unit based on appropriate central wavelengths to emit light according to color requirements of a display so as to form a first chromatic triangle defined by three central wavelengths of the selected each one of the red, green and blue semiconductor laser units and a second chromatic triangle defined by two of the three central wavelengths of two of the selected each one of the red, green and blue semiconductor laser units and one of the central wavelength of the selected another one of the red, green or blue semiconductor laser unit, wherein the one central wavelength of the selected another one of the red, green or blue semiconductor laser unit falls into a region not covered by the first chromatic triangle.

\* \* \* \* \*